(12) United States Patent
Chiang et al.

(10) Patent No.: US 11,546,654 B2
(45) Date of Patent: Jan. 3, 2023

(54) WIRELESS PROJECTING CONTROL METHOD AND WIRELESS PROJECTING CONTROL SYSTEM CAPABLE OF PROVIDING HIGH DATA TRANSMISSION SECURITY ACCORDING TO VARIOUS AUTHORITY LEVELS

(71) Applicants: BenQ Intelligent Technology (Shanghai) Co., Ltd, Shanghai (CN); BENQ CORPORATION, Taipei (TW)

(72) Inventors: Chin-Fu Chiang, Taipei (TW); Chen-Chi Wu, Taipei (TW); Chia-Nan Shih, Taipei (TW); Lin-Yuan You, Taipei (TW); Jung-Kun Tseng, Taipei (TW); Chuang-Wei Wu, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/395,418

(22) Filed: Aug. 5, 2021

(65) Prior Publication Data
US 2022/0060776 A1    Feb. 24, 2022

(30) Foreign Application Priority Data
Aug. 24, 2020   (CN) .......................... 202010854678.1

(51) Int. Cl.
*H04N 21/436*    (2011.01)
*H04W 4/70*    (2018.01)

(52) U.S. Cl.
CPC ............ *H04N 21/436* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 10,063,904 B2* | 8/2018 | Morales | H04M 1/72409 |
| 10,505,998 B1* | 12/2019 | Ackerman | H04L 65/4025 |
| 2010/0037151 A1* | 2/2010 | Ackerman | G06Q 10/10 |
| | | | 715/753 |
| 2011/0154192 A1* | 6/2011 | Yang | G06F 40/171 |
| | | | 715/256 |
| 2013/0024883 A1* | 1/2013 | Elmaleh | H04N 21/4788 |
| | | | 725/25 |
| 2015/0195286 A1* | 7/2015 | Doppler | H04L 67/125 |
| | | | 726/4 |

(Continued)

FOREIGN PATENT DOCUMENTS

| | | | | |
|---|---|---|---|---|
| TW | 201430473 A | 8/2014 | | |
| TW | I697237 B | 6/2020 | | |
| WO | WO-2017019911 A1 * | 2/2017 | | H04L 65/4015 |

*Primary Examiner* — William J Kim
(74) *Attorney, Agent, or Firm* — Winston Hsu

(57) ABSTRACT

A wireless projecting control method includes setting at least one operation restriction, communicating a transmitter with a receiver or a communication device for executing at least one restricted operation by the transmitter or the receiver, and selectively or restrictedly projecting an image signal to a display device by the receiver after the transmitter or the receiver executes the at least one restricted operation. The image signal is generated by the communication device. The transmitter is used for transmitting the image signal to the receiver according to the at least one operation restriction.

19 Claims, 7 Drawing Sheets

(56) References Cited

U.S. PATENT DOCUMENTS

| | | | |
|---|---|---|---|
| 2016/0072925 A1* | 3/2016 | Yamada | H04L 12/2809 |
| | | | 709/217 |
| 2016/0269412 A1* | 9/2016 | Farah | H04L 63/10 |
| 2017/0264446 A1* | 9/2017 | Rose | H04L 12/1818 |
| 2019/0304507 A1* | 10/2019 | Leyfman | H04N 21/43615 |
| 2021/0035464 A1* | 2/2021 | Otero | G09B 23/181 |
| 2021/0344671 A1* | 11/2021 | Chiang | H04L 63/0846 |

* cited by examiner

WIRELESS PROJECTING CONTROL METHOD AND WIRELESS PROJECTING CONTROL SYSTEM CAPABLE OF PROVIDING HIGH DATA TRANSMISSION SECURITY ACCORDING TO VARIOUS AUTHORITY LEVELS

BACKGROUND OF THE INVENTION

1. Field of the Invention

The present invention illustrates a wireless projecting control method and a wireless projecting control system, and more particularly, a wireless projecting control method and a wireless projecting control system capable of providing high data transmission security according to various authority levels.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency.

However, as previously mentioned, in order to perform wireless communication data transmission, an indispensable condition is that a specific software program needs to be installed in the computer, or a link between a paired transmitter and a paired receiver is established. When the specific software program is installed in the computer, it may cause a risk of data leakage. For example, a computer having the specific software program can generate key data for performing authorized sharing functions. However, if the computer is hacked, all sharing data of the computer may be illegally extracted. Therefore, it is an important issue to develop a system applied to a conference program with high data transmission security and high operational flexibility for various authority levels.

SUMMARY OF THE INVENTION

In an embodiment of the present invention, the wireless projecting control method is disclosed. The wireless projecting control method comprises setting at least one operation restriction, communicating a transmitter with a receiver or a communication device for executing at least one restricted operation by the transmitter or the receiver, and selectively or restrictedly projecting an image signal to a display device by the receiver after the transmitter or the receiver executes the at least one restricted operation. The image signal is generated by the communication device. The transmitter is used for transmitting the image signal to the receiver according to the at least one operation restriction.

In another embodiment of the present invention, the wireless projecting control system is disclosed. The wireless projecting control system comprises a receiver, a communication device, a transmitter linked the receiver or the communication device, and a display device coupled to the receiver and configured to display an image. After at least one operation restriction is set, the transmitter communicates with the receiver or the communication device for executing at least one restricted operation by the transmitter or the receiver. The receiver selectively or restrictedly projects an image signal to the display device after the transmitter or the receiver executes the at least one restricted operation. The image signal is generated by the communication device. The transmitter is used for transmitting the image signal to the receiver according to the at least one operation restriction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
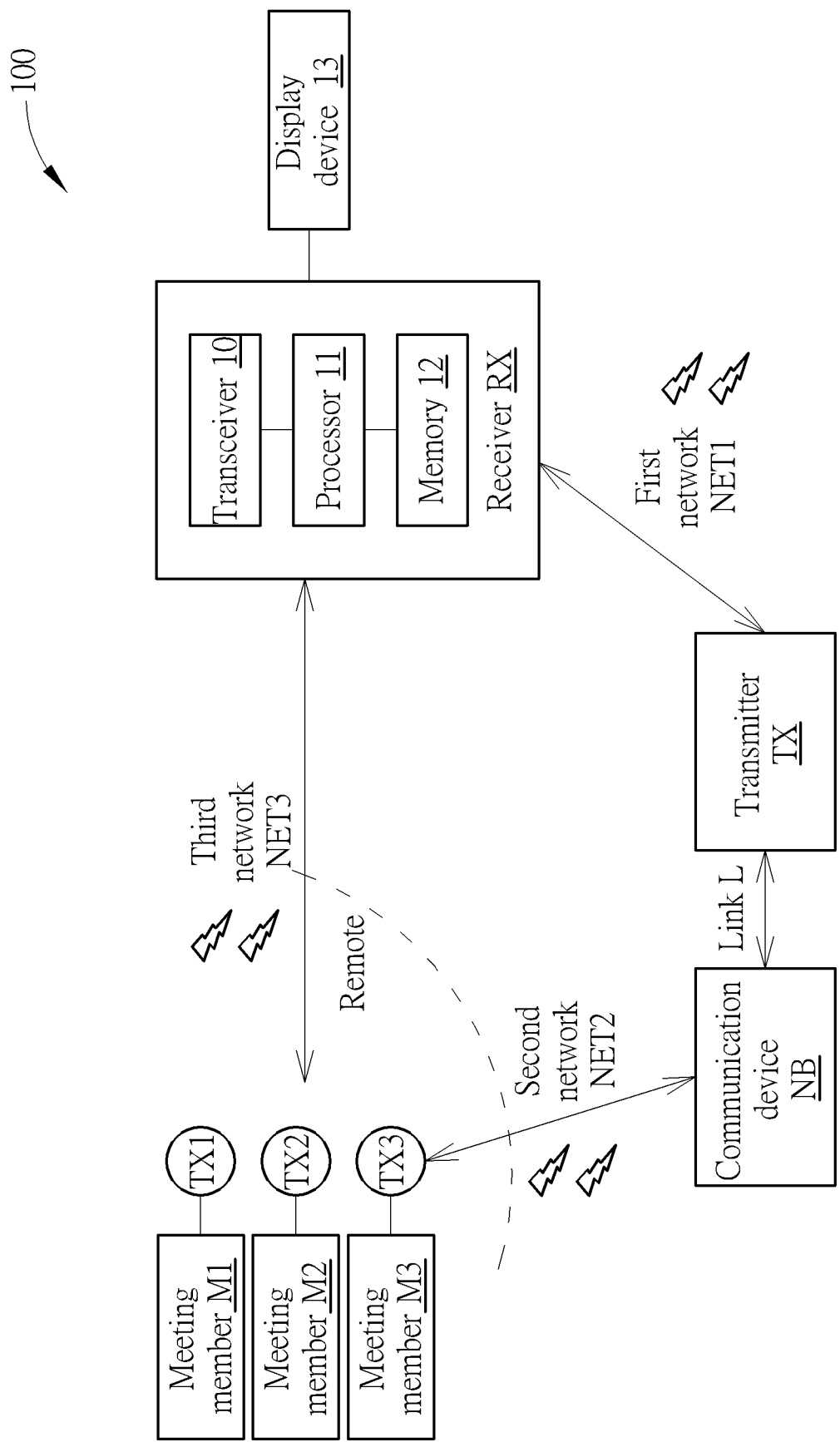
FIG. 1 is a block diagram of a wireless projecting control system according to an embodiment of the present invention.

FIG. 1 is a block diagram of a wireless projecting control system 100 according to an embodiment of the present invention. The wireless projecting control system 100 can be applied to presenting conference reports and performing remote data sharing processes. The wireless projecting control system 100 includes a receiver RX, a communication device NB, a transmitter TX, and a display device 13. The receiver RX is capable of accessing data by using wireless or wired communications. The receiver RX includes a transceiver 10, a processor 11 and a memory 12. The processor 11 is coupled to the transceiver 10 and the memory 12 for controlling the transceiver 10 and the memory 12. The processor 11 can be any processing chip or a programmable computing unit. The communication device NB can be an electronic device capable of processing data and performing data communications, such as a desktop computer, a notebook, a smart phone, or a tablet. The transmitter TX can establish a link with the receiver RX and/or the communication device NB. For example, the transmitter TX and the communication device NB can use a universal serial bus (USB) or a C-type universal serial bus (USB-Type C) port for establishing a link L. The display device 13 is coupled to the receiver RX for displaying images. The display device 13 can be any display, such as a liquid crystal display (LCD) or an organic light-emitting diode (OLED) display. In the wireless projecting control system 100, after at least one operation restriction is configured, the transmitter TX can communicate with the receiver RX or the communication device NB. Therefore, the transmitter TX or the receiver RX can perform at least one restricted operation. Further, after the transmitter TX or the receiver RX performs at least one restricted operation, the receiver RX can selectively or restrictedly project the image signal to the display device 13. The transmitter TX is used for selectively transmitting the image signal generated by the communication device NB to the receiver RX according to at least one operation restriction. Briefly, data communications between the transmitter TX and the receiver RX or the communication device NB in the wireless projecting control system 100 can include the following modes: (A) the transmitter TX transmits data to the receiver RX, (B) the receiver RX transmits data to the transmitter TX, (C) the transmitter TX transmits data to the communication device NB, (D) the communication device NB transmits data to the transmitter TX. The wireless projecting control system 100 can use the aforementioned four communication modes for increasing data security levels in conjunction with providing various authorization operations. Details of the four communication modes of the wireless projecting control system 100 are illustrated later.

Figure 2:
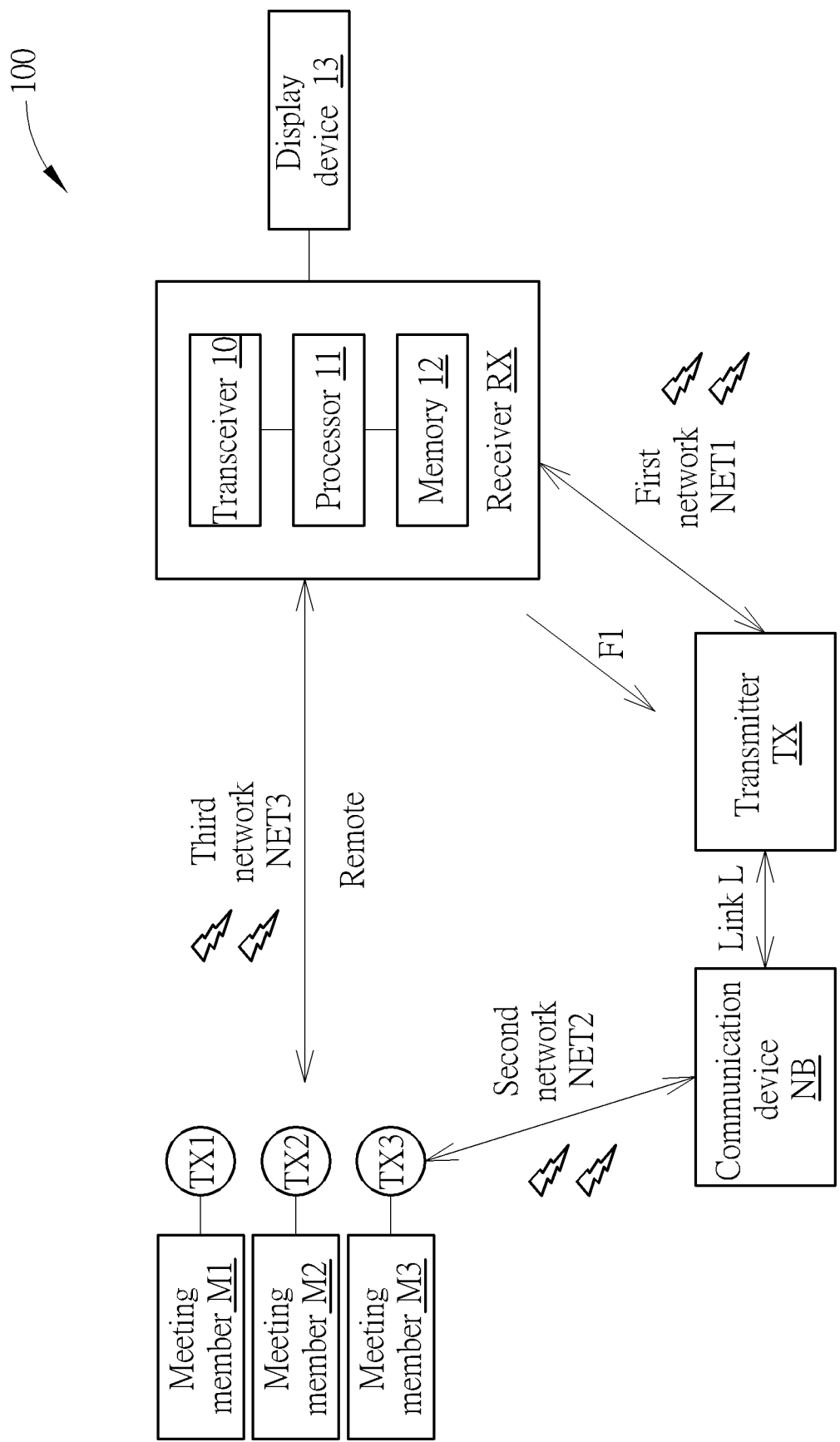
FIG. 2 is an illustration of transmitting data from a receiver to a transmitter through a data path of the wireless projecting control system in FIG. 1.

FIG. 2 is an illustration of transmitting data from the receiver RX to the transmitter TX through a data path F1 of the wireless projecting control system 100. In FIG. 2, the receiver RX transmits the control signal with the first authority level to the transmitter TX through the data path F1. Further, after the transmitter TX receives the control signal from the receiver RX, the transmitter TX can execute at least one first operation restriction according to the first authority level. The first authority level can be set by the receiver RX for reducing a risk of data leakage. In other words, in FIG. 2, the receiver RX can transmit data to the transmitter TX. The transmitter TX can receive data transmitted from the receiver RX. In other words, the transmitter TX and the receiver RX are two pair-wised bi-directional data communication devices. The data path F1 can belong to a first network NET1. The first network NET1 may be a wireless network, such as a Wi-Fi network. The control signal generated by the receiver RX can also carry key data. The transmitter TX can transmit the key data to the communication device NB or any device used by remote user (i.e., such as meeting members M1 to M3) for data sharing. In FIG. 2, since the receiver RX can generate a control signal with key data, it has a higher security level than the key data directly generated by the computer through a software program.

Figure 3:
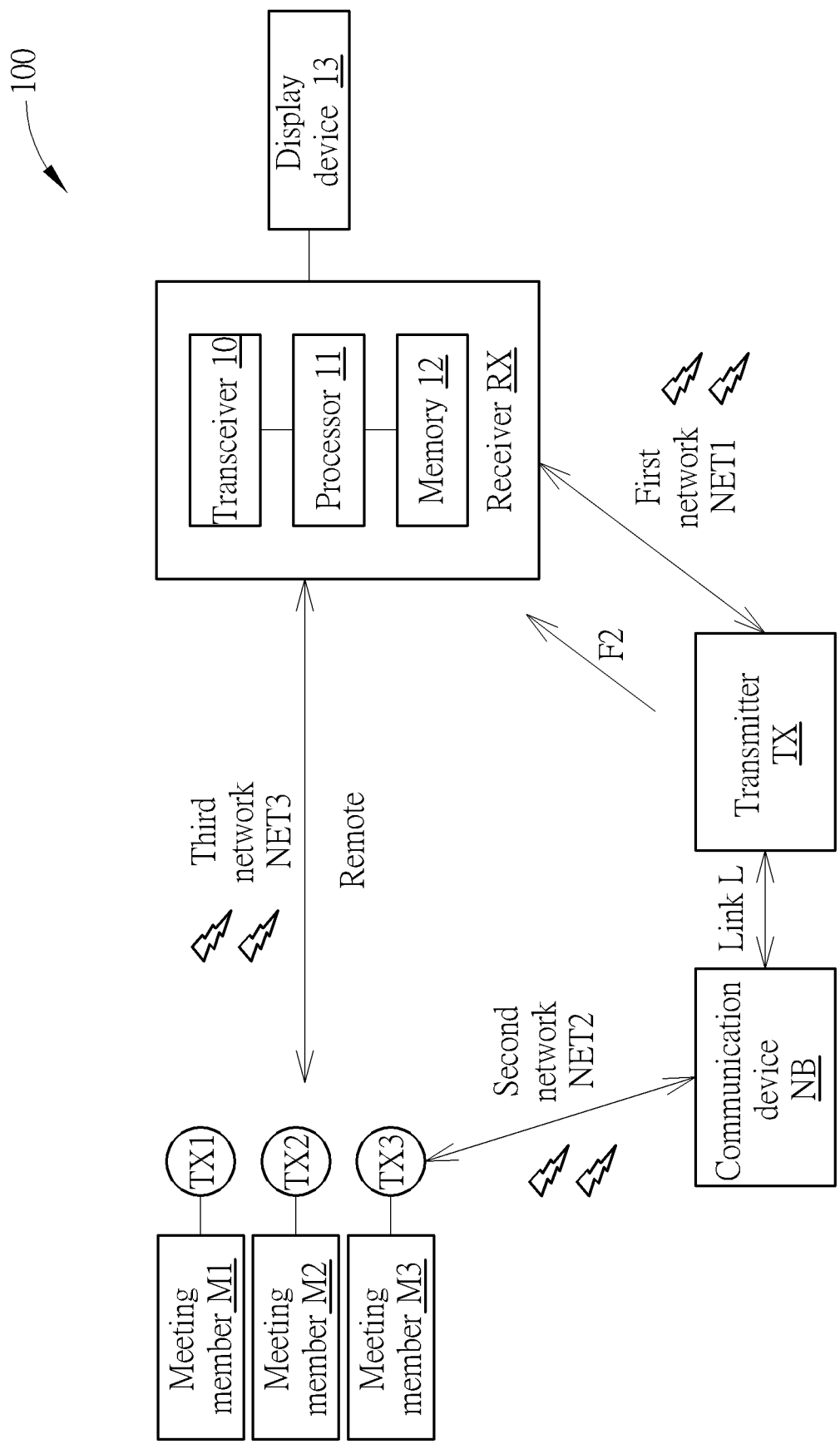
FIG. 3 is an illustration of transmitting data from a transmitter to a receiver through a data path of the wireless projecting control system in FIG. 1.

FIG. 3 is an illustration of transmitting data from the transmitter TX to the receiver RX through a data path of the wireless projecting control system 100. In FIG. 3, after the transmitter TX is triggered, the transmitter TX transmits the image signal to the receiver RX. The receiver RX controls the display device 13 for displaying the image signal having at least one second operation restriction according to the second authority level. Further, the second authority level can be set by the transmitter TX or the receiver RX for reducing the risk of data leakage. In other words, in FIG. 3, the transmitter TX transmits data to the receiver RX. The data path F2 can belong to the first network NET1. The first network NET1 may be a wireless network, such as a Wi-Fi network. The receiver RX can also set key data. The receiver RX can also selectively control the display device 13 for displaying the image signal according to the key data. Similarly, in FIG. 3, since the receiver RX can generate key data, it has a higher security level than the key data directly generated by the computer using the software program.

Figure 4:
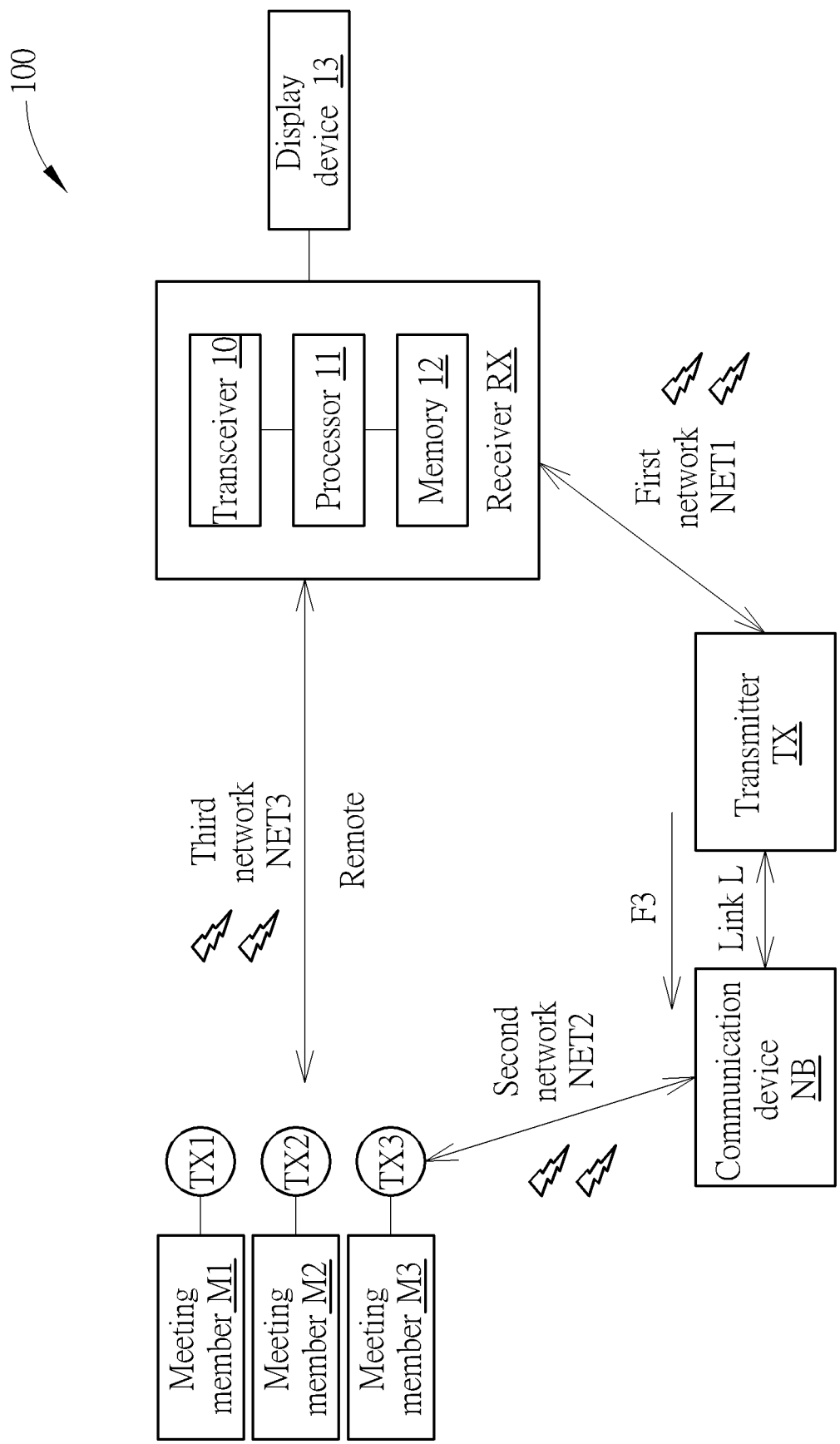
FIG. 4 is an illustration of transmitting data from the transmitter to a communication device through a data path of the wireless projecting control system in FIG. 1.

FIG. 4 is an illustration of transmitting data from the transmitter TX to the communication device NB through a data path F3 of the wireless projecting control system 100. In FIG. 4, the communication device NB can receive an event message of the receiver RX through the transmitter TX with the third authority level. In other words, the transmitter TX in FIG. 4 has its authority level and is capable of relaying data. In FIG. 4, the transmitter TX transmits data to the communication device NB. The communication device NB receives the data transmitted from the transmitter TX. Further, the receiver RX can also set key data and can transmit the key data to the communication device NB through the transmitter TX. Similarly, in FIG. 4, since the receiver RX can generate the key data, it has a higher security level than the key data directly generated by the computer using the software program. Further, after the communication device NB receives the data transmitted from the transmitter TX, the communication device NB can transmit the data to at least one transmitter (i.e., such as transmitters TX1 to TX3) used by remote meeting members M1 to M3 according to the third authority level. In other words, in FIG. 4, the communication device NB can transmit data to remote users (meeting members) through the second network NET2. The second network NET2 may be a mobile communication network. Further, when the third authority level is increased, at least one third operation restriction corresponding to the third authority level used for configuring to relay the event message from the communication device NB to at least one another transmitter is decreased. When the third authority level is decreased, the at least one third operation restriction used for configuring to relay the event message from the communication device NB to at least one another transmitter is increased. Here, a definition of the event message can include transmitting image data, transmitting key data, and transmitting authorization data.

Figure 5:
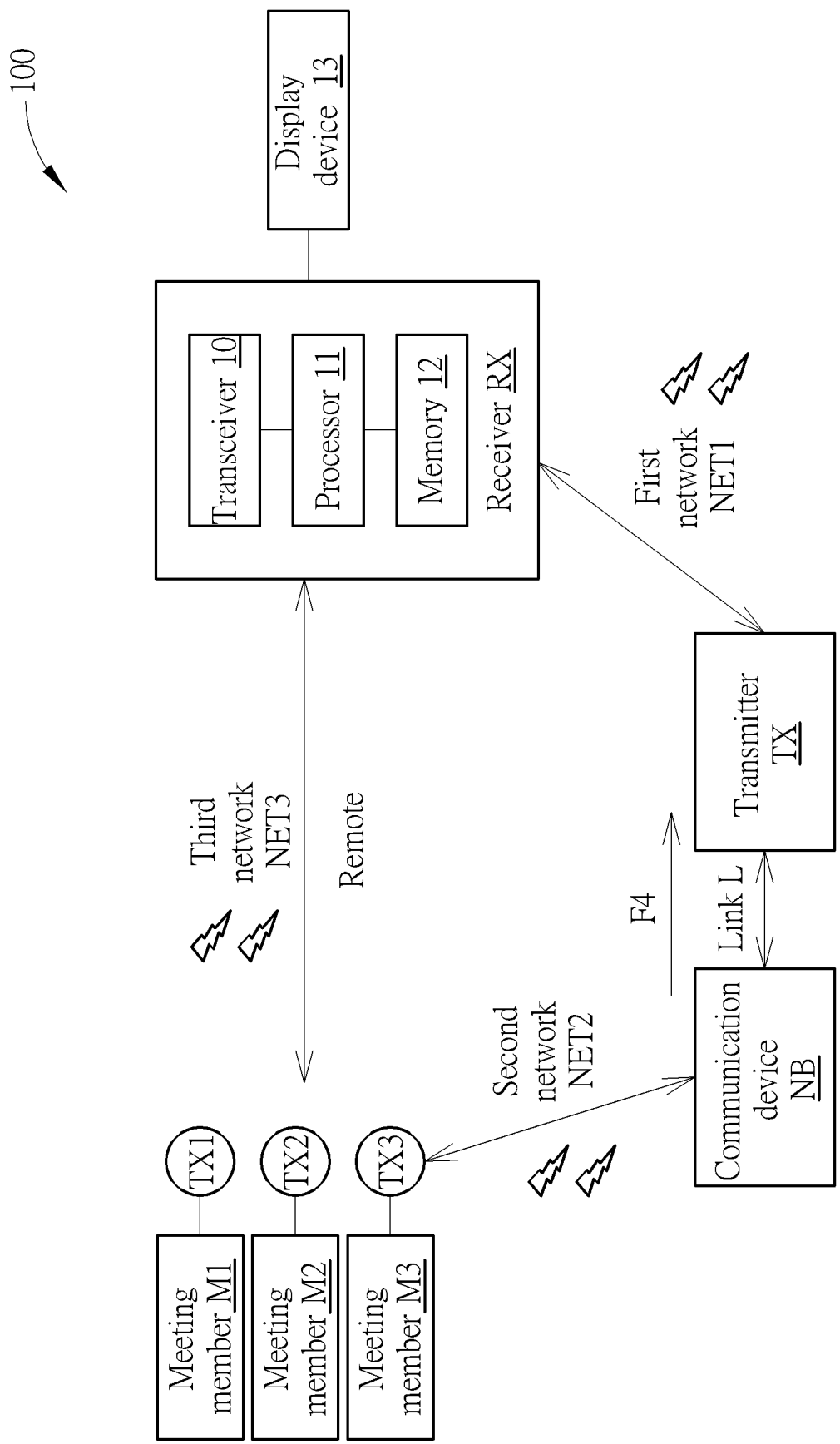
FIG. 5 is an illustration of transmitting data from the communication device to the transmitter through a data path of the wireless projecting control system in FIG. 1.

FIG. 5 is an illustration of transmitting data from the communication device NB to the transmitter TX through a data path F4 of the wireless projecting control system 100. In FIG. 5, the communication device NB can set a fourth authority level. Therefore, when the communication device NB transmits the image signal to the receiver RX through the transmitter TX, the display device 13 can display the image signal having at least one fourth operation restriction. In FIG. 5, the communication device NB transmits data to the transmitter TX. The communication device NB can generate the key data. In other words, the key data generated by the communication device NB can be transmitted to the transmitter TX and the receiver RX. Although the key data generated by the communication device NB cause information security risk, the wireless projecting control system 100 can also support this communication mode for increasing operational convenience.

As aforementioned FIG. 2 to FIG. 5, the four communication modes introduce the first authority level, the second authority level, the third authority level, the fourth authority level, at least one first operation restriction, at least one second operation restriction, at least one third operation restriction, and at least one fourth operation restriction. In practice, for example, in a communication mode: "the receiver RX transmitting data to the transmitter TX", the receiver RX can control the transmitter TX for disabling a screen projection function from 2 pm to 3 pm, or control a certain transmitter linked to the receiver RX for disabling the screen projection function from 3 pm to 4 pm. For example, in a communication mode: "the transmitter TX transmitting data to the receiver RX", the authority configuration can include masking a part of the image contents by the transmitter TX, or partially blocking recognized text contents outputted by the transmitter TX. Alternatively, when the receiver RX is linked to a plurality of display devices 13, image contents of some display devices 13 can be blocked, and the image contents of some other display devices 13 can be displayed. For example, in a communication mode: "the transmitter TX transmitting data to the communication device NB", when the transmitter TX has a high authority level, the data (i.e., including the key data, the authority data, and the image data) can be transmitted to electronic devices used by remote meeting users M1 to M3 through the communication device NB anytime. On the contrary, if the authority level of the transmitter TX is very low, the data (i.e., including the key data, the authority data, and the image data) can only be transmitted to electronic devices used by remote meeting users M1 to M3 through the communication device NB during a specific time period. For example, in the communication mode: "the communication device NB transmitting data to the transmitter TX", the communication device NB can control the transmitter TX for disabling a screen projection function from 2 pm to 3 pm, or control a certain transmitter linked to the receiver RX for disabling the screen projection function from 3 pm to 4 pm. However, the present invention is not limited to aforementioned four communication modes and their applications. Any reasonable technology modification falls into the scope of the present invention.

Further, the receiver RX may store a member list. The receiver RX can read the member list. Therefore, the communication device NB can acquire at least one authority level according to the member list. Further, information of the at least one authority level can be stored in the communication device NB. However, the receiver RX can acquire the member list by using any method. For example, the receiver RX can acquire the member list from a cloud server. In other words, the information of the at least one authority level can also be stored in the cloud server. Further, the "member list" can be determined by meeting letter data, grouping list data of the communication application program, and/or member information of a communication database. In other words, the member list can be the default personal information of the conference participants. The member list can also be dynamically changed during a meeting process. Further, the aforementioned "timeliness" data can include timeliness information. The key data can be synchronized with the receiver RX through the third network NET3. In other words, the receiver RX performing at least one restricted operation according to the key data can be regarded as a timeliness operation of the receiver RX related to scheduling time. If the scheduled time expires, authorization of sharing conference data is invalid.

Further, in the wireless projecting control system 100, the transmitter TX can be regarded as a virtual display device, as illustrated below. For example, when the transmitter TX is coupled to the communication device NB, the transmitter TX can transmit extended display identification data (EDID) to a data processing device of the communication device NB (i.e., the central processing unit or graphics card of a notebook). Further, the data processing device can identify the transmitter TX as the virtual display device according to the EDID for transmitting the image signal to the transmitter TX after the data processing device receives the EDID. Then, the transmitter TX can transmit the image signal to the receiver RX for displaying images. Therefore, the receiver RX can control the display device 13 to display images according to the image signal of the communication device NB.

Figure 6A:
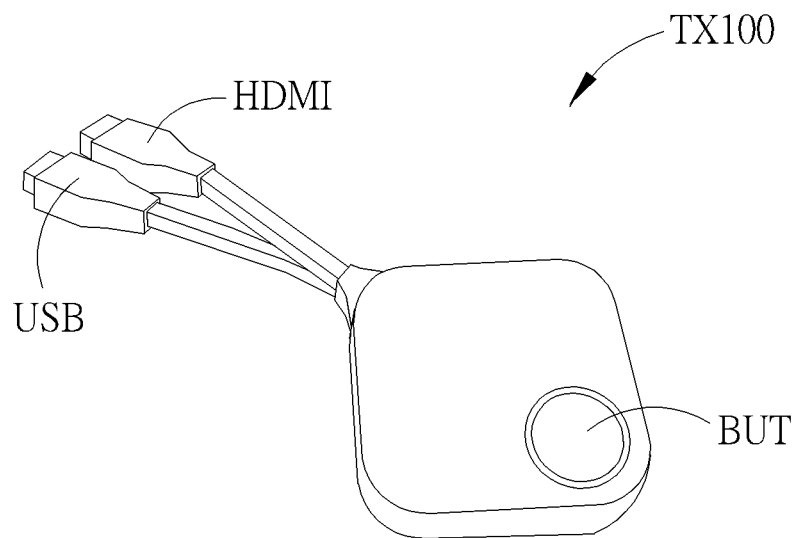
FIG. 6A is a first appearance of the transmitter of the wireless projecting control system in FIG. 1.
Figure 6B:
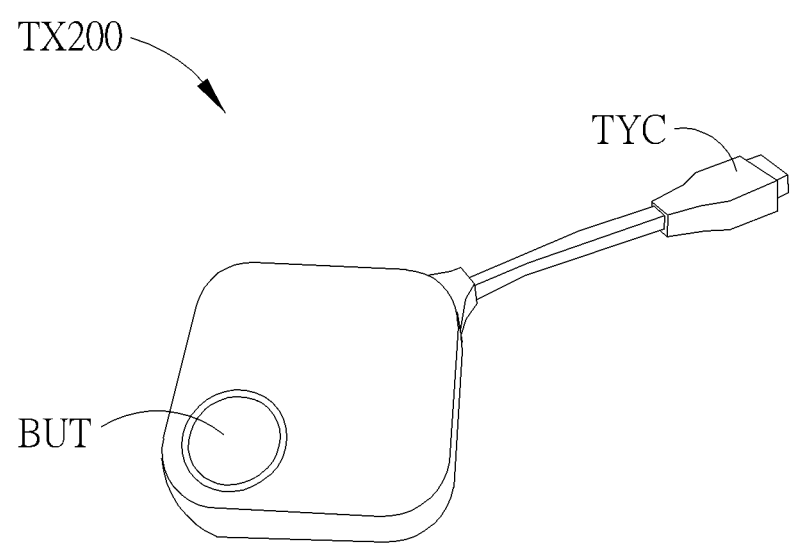
FIG. 6B is a second appearance of the transmitter of the wireless projecting control system in FIG. 1.

FIG. 6A is a first appearance of the transmitter TX of the wireless projecting control system 100. FIG. 6B is a second appearance of the transmitter TX of the wireless projecting control system 100. To avoid ambiguity, the transmitter in FIG. 6A is denoted as a transmitter TX100 hereafter. The transmitter in FIG. 6B is denoted as a transmitter TX200 hereafter. As shown in FIG. 6A and FIG. 6B, the transmitter TX100 and the transmitter TX200 have buttons BUT. The button BUT can also be regarded as a control button for triggering transmission of the image signal to the receiver RX. For example, after the transmitter TX100 is paired with the receiver RX for establishing a link, when the user presses the button BUT of the transmitter TX100, the transmitter TX100 can transmit the image signal to the receiver RX. The receiver RX can control the display device 13 for displaying images according to the image signal. Further, as previously mentioned, the transmitter can be linked to a corresponding communication device (i.e., such as a notebook). Therefore, the transmitter can include at least one data transmission port. For example, the transmitter TX100 can use the USB Type-A transmission port USB and/or the High Definition Multimedia Interface (HDMI) transmission port HDMI for linking to the corresponding communication device. Further, the transmitter TX200 can be linked to the corresponding communication device by using a C-type universal serial bus (USB Type-C) transmission port TYC. However, embodiments of the present invention are not limited to signal formats. Any reasonable hardware modification such as a cable length, a transmission port specification, or a device appearance design falls into the scope of the present invention.

Figure 7:
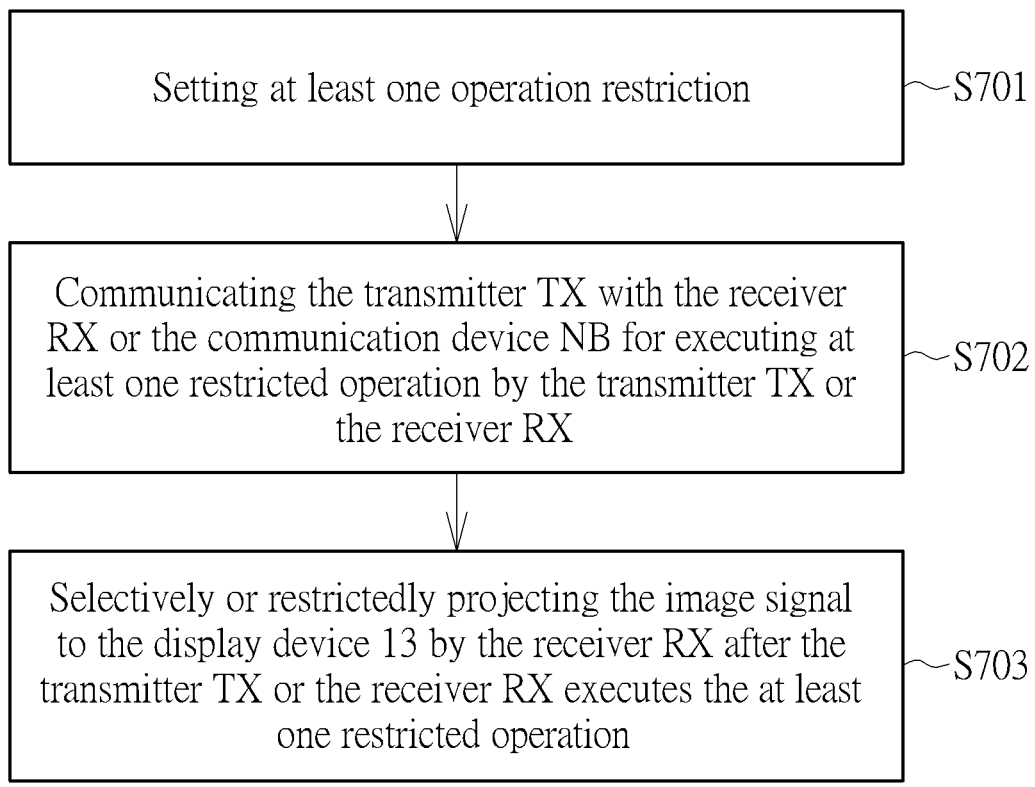
FIG. 7 is a flow chart of a wireless projecting control method performed by the wireless projecting control system in FIG. 1.

FIG. 7 is a flow chart of a wireless projecting control method performed by the wireless projecting control system 100. The wireless projecting control method can include step S701 to step S703. Any reasonable technology modification falls into the scope of the present invention. Step S701 to step S703 are illustrated below.

step S701: setting at least one operation restriction;
step S702: communicating the transmitter TX with the receiver RX or the communication device NB for executing at least one restricted operation by the transmitter TX or the receiver RX;
step S703: selectively or restrictedly projecting the image signal to the display device 13 by the receiver RX after the transmitter TX or the receiver RX executes the at least one restricted operation.

In the wireless projecting control system 100, the transmitter TX can communicate with the receiver RX or the communication device NB. The transmitter TX or the receiver RX can set at least one operation restriction corresponding to the authority data. The receiver RX can also transmit the key data to the communication device NB through the transmitter TX. Therefore, the wireless projecting control system 100 can customize authority levels, including features or restrictions of displaying authority, browsing authority, and data accessing authority. Further, the key data of the wireless projecting control system 100 can be generated by the receiver instead of the application program of the communication device NB (such as a computer). Therefore, the wireless projecting control system 100 can improve data security levels.

To sum up, the present invention illustrates a wireless projecting control method and a wireless projecting control system. The wireless projecting control system can support the remote meeting data sharing function. Further, the wireless projecting control system can customize authority levels, including features or restrictions of displaying authority, browsing authority, and data accessing authority. In addition, the key data of the wireless projecting control system can be set by the receiver or automatically generated by the receiving device. Therefore, the wireless projecting control system of the present invention has a higher security level than the key data directly generated by the computer through a software program.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless projecting control method comprising:
setting at least one operation restriction;
receiving an event message of a receiver by a communication device through a transmitter for executing at least one restricted operation by the transmitter or the receiver; and
selectively or restrictedly projecting an image signal to a display device by the receiver after the transmitter or the receiver executes the at least one restricted operation;
wherein the image signal is generated by the communication device, and the transmitter is used for transmitting the image signal to the receiver according to the at least one operation restriction; and
wherein the transmitter has a third authority level, when the third authority level is increased, at least one third operation restriction corresponding to the third authority level used for configuring to relay the event message from the communication device to at least one another transmitter is decreased, and when the third authority level is decreased, the at least one third operation restriction used for configuring to relay the event message from the communication device to the at least one another transmitter is increased.

2. The method of claim 1, wherein communicating the transmitter with the receiver or the communication device for executing the at least one restricted operation by the transmitter or the receiver comprises:
the receiver transmitting a control signal having a first authority level to the transmitter; and
after the control signal is received by the transmitter, the transmitter executes at least one first restricted operation corresponding to the first authority level according to the first authority level.

3. The method of claim 1, wherein communicating the transmitter with the receiver or the communication device for executing the at least one restricted operation by the transmitter or the receiver comprises:
transmitting the image signal from the transmitter to the receiver after the transmitter is triggered; and
controlling the display device for displaying the image signal according to at least one second restricted operation by the receiver after a second authority level is acquired;
wherein the at least one second restricted operation corresponds to the second authority level, and the second authority level is configured by the transmitter or the receiver.

4. The method of claim 1, wherein communicating the transmitter with the receiver or the communication device for executing the at least one restricted operation by the transmitter or the receiver comprises:
configuring a fourth authority level by the communication device for displaying the image signal on the display device according to at least one fourth operation restriction corresponding to the fourth authority level when the image signal is transmitted from the communication device to the receiver through the transmitter.

5. The method of claim 1, further comprising:
establishing a member list and saving the member list to the receiver;
reading the member list by the receiver; and
acquiring at least one authority level by the communication device according to the member list after the member list is read by the receiver;
wherein the communication device saves information of the at least one authority level.

6. The method of claim 1, further comprising:
acquiring a member list from a cloud server by the receiver; and
acquiring at least one authority level by the communication device according to the member list after the receiver reads the member list;
wherein information of the at least one authority level is saved in the cloud server.

7. The method of claim 1, wherein the receiver has a member list, and the member list is determined by meeting letter data, grouping list data of the communication application program, and/or member information of a communication database.

8. The method of claim 1, wherein the at least one restricted operation comprises timeliness information of scheduled time of a conference, and if the scheduled time expires, authorization of sharing conference data is invalid.

9. The method of claim 1, further comprising:
transmitting an extended display identification data (EDID) from the transmitter to a data processing device of the communication device after the communication device establishes a link with the transmitter; and
identifying the transmitter as a virtual display device by the data processing device according to the EDID for transmitting the image signal from the data processing device to the transmitter after the data processing device receives the EDID.

10. A wireless projecting control system comprising:
a receiver;
a communication device;
a transmitter linked to the receiver or the communication device; and
a display device coupled to the receiver and configured to display an image;
wherein after at least one operation restriction is set, the transmitter communicates with the receiver or the communication device for executing at least one restricted operation by the transmitter or the receiver, the receiver selectively or restrictedly projects an image signal to the display device after the transmitter or the receiver executes the at least one restricted operation, the image signal is generated by the communication device, and the transmitter is used for transmitting the image signal to the receiver according to the at least one operation restriction; and wherein an event message of the receiver is received by the communication device through the transmitter, the transmitter has a third authority level, when the third authority level is increased, at least one third operation restriction corresponding to the third authority level used for configuring to relay the event message from the communication device to at least one another transmitter is decreased, and when the third authority level is decreased, the at least one third operation restriction used for configuring to relay the event message from the communication device to the at least one another transmitter is increased.

11. The system of claim 10, wherein the receiver transmits a control signal having a first authority level to the transmitter, and after the control signal is received by the transmitter, the transmitter executes at least one first restricted operation corresponding to the first authority level according to the first authority level.

12. The system of claim 10, wherein the transmitter transmits the image signal to the receiver after the transmitter is triggered, the receiver controls the display device for displaying the image signal according to at least one second restricted operation after a second authority level is acquired, the at least one second restricted operation corresponds to the second authority level, and the second authority level is configured by the transmitter or the receiver.

13. The system of claim 10, wherein a fourth authority level is configured by the communication device for displaying the image signal on the display device according to at least one fourth operation restriction corresponding to the fourth authority level when the image signal is transmitted from the communication device to the receiver through the transmitter.

14. The system of claim 10, wherein after a member list is established, the member list is saved to the receiver, the member list is read by the receiver, at least one authority level is acquired by the communication device according to the member list after the member list is read by the receiver, and the communication device saves information of the at least one authority level.

15. The system of claim 10, wherein the receiver acquires a member list from a cloud server, the communication device acquires at least one authority level according to the member list after the receiver reads the member list, and information of the at least one authority level is saved in the cloud server.

16. The system of claim 10, wherein the receiver has a member list, and the member list is determined by meeting letter data, grouping list data of the communication application program, and/or member information of a communication database.

17. The system of claim 10, wherein the at least one restricted operation comprises timeliness information of scheduled time of a conference, and if the scheduled time expires, authorization of sharing conference data is invalid.

18. The system of claim 10, wherein an extended display identification data (EDID) is transmitted from the transmitter to a data processing device of the communication device after the communication device establishes a link with the transmitter, and the data processing device identifies the transmitter as a virtual display device according to the EDID for transmitting the image signal from the data processing device to the transmitter after the data processing device receives the EDID.

19. A wireless projecting control system comprising:

a receiver;

a communication device;

a transmitter linked to the receiver or the communication device; and a display device coupled to the receiver and configured to display an image;

wherein after at least one operation restriction is set, the transmitter communicates with the receiver or the communication device for executing at least one restricted operation by the transmitter or the receiver, the receiver selectively or restrictedly projects an image signal to the display device after the transmitter or the receiver executes the at least one restricted operation, the image signal is generated by the communication device, and the transmitter is used for transmitting the image signal to the receiver according to the at least one operation restriction; and wherein extended display identification data (EDID) is transmitted from the transmitter to a data processing device of the communication device after the communication device establishes a link with the transmitter, and the data processing device identifies the transmitter as a virtual display device according to the EDID for transmitting the image signal from the data processing device to the transmitter after the data processing device receives the EDID.

* * * * *